United States Patent [19]

Pooser, Jr.

[11] 4,150,960
[45] Apr. 24, 1979

[54] MOVEABLE TOP SEAL FOR AN ELIMINATOR SHEET CORE

[75] Inventor: A. Keith Pooser, Jr., Winston-Salem, N.C.

[73] Assignee: Envirotech Corporation, Menlo Park, Calif.

[21] Appl. No.: 716,607

[22] Filed: Aug. 23, 1976

[51] Int. Cl.² .............................................. B01D 45/16
[52] U.S. Cl. ......................................... 55/440; 55/436; 55/478; 206/454; 206/503; 312/286
[58] Field of Search ................. 55/436, 440, 502, 278, 55/493, 497, 359, 478, 480, 481, 257 PV, 511, 242, DIG. 31; 206/454, 503; 312/286; 98/121 R

[56] References Cited

U.S. PATENT DOCUMENTS

| 1,992,051 | 2/1935 | Anderson | 55/481 X |
| 2,911,011 | 11/1959 | Niehart | 55/440 X |
| 3,864,110 | 2/1975 | Wyman et al. | 55/440 |

Primary Examiner—Frank W. Lutter
Assistant Examiner—Kathleen J. Prunner
Attorney, Agent, or Firm—William S. Bernheim; Robert E. Krebs

[57] ABSTRACT

An eliminator core having a hinged member for sealing the top edges of a plurality of eliminator sheets formed in a bundle. More particularly the core having a cam for displacing the hinged member.

6 Claims, 11 Drawing Figures

MOVEABLE TOP SEAL FOR AN ELIMINATOR SHEET CORE

BACKGROUND

1. Field of the Invention

This invention generally relates to a gas separator utilizing deflectors which are parallel and continuous non-planar.

2. Description of the Prior Art

Air washers are used to wash air and to remove entrained particles of liquid, such as water, from air or other gases. In the air washer zig-zag shaped eliminator sheets upon which moisture-laden air can deposit water are mounted in a frame to comprise what will be referred to as an eliminator core. In the eliminator core, the sheets are grouped as a bundle to form tortuous paths for the air moving through the air washer. Various deflectors and nozzles are commonly employed in the air washer upstream of the eliminator core in the path of moving air to wash the air with liquid. As a result of the washing, the air entering the eliminator core is relatively clean but supersaturated with moisture. In the eliminator core, entrained liquid particles are removed as the air, at high velocity, changes directions along the tortuous paths between the zig-zag shaped eliminator sheets and the entrained particles are caused to impinge on and drain down the eliminator sheets for collection below the core.

As a result of the environment in which they are employed, the eliminator sheets are prone to having solids as well as liquids deposited on their surfaces and must be periodically cleaned. This is particularly true in textile mills where lint, fly and starches are carried in the air and readily join with the water in the air to cover the eliminator sheets with a glue-like coating.

As part of the eliminator core, a seal is normally employed on the top of the eliminator bundle to channel the air and also to provide additional rigidity by contacting the top edges of the eliminator sheets. The seal, normally a flat sealing plate covered with an elastomeric pad, complicates the maintenance of the sheets because the seal must be broken to allow movement or removal of the sheets for cleaning or replacement. One method used to improve this general design has been to hinge the entire top of the core to permit easy access to the top of the sheets and removal of the sheets through the top. When a first core has a second core stacked thereon, or some other obstruction thereabove, such a hinge on the first core cannot be utilized without first unstacking the second core or removing the obstruction thereabove.

Stacking of eliminator cores is common and is employed to meet capacity requirements. The eliminator sheets of the bundle are usually prefabricated in convenient lengths (the longest dimension), and pressure drop places a practical limit to eliminator sheet width (the distance from the inlet edge to the outlet edge).

Across the top of the eliminator core, above the eliminator bundle, transverse steel channels are normally utilized across the inlet side and across the outlet side as a means of providing rigidity to the core during handling and for stacking purposes. The channels provide a vertical space of approximately three inches between the top of the eliminator bundle and the top of the eliminator core.

Another area of concern during operation of the air washer is the spacing between the sheets and sheet vibration. The spacing, normally equal, is designed to equalize the pressure drop across the tortuous paths between the sheets to prevent flow disturbances which can prevent removal of the entrained particles. Sheet vibration can also cause flow disturbances and is a major cause of sheet wear. Means usually spacer bars are used to maintain the spacing and minimize the vibration during operation of the air washer. The spacer bars are commonly located at interim locations between the top and bottom of the eliminator bundle on the inlet edges and outlet edges of the eliminator sheets.

The conventional spacer bar is a metal angle or zee bar with slots spaced to accommodate the edges of the eliminator sheets at the proper locations. Typically there is a means of locking in place or restricting the motion of the eliminator sheet edges with respect to the slots. U.S. Pat. No. 3,276,193 to Lamb is an example. The locking or restricting means often slows spacer bar removal to allow movement or removal of the sheets.

These conventional spacer bars have major disadvantages. The flat surfaces of the spacer bars exposed to the primary direction of flow in the air stream cause a pressure drop and will also tend to collect grains of water moisture which in turn form droplets. The droplets thus formed, especially on the exhaust side, will accumulate moisture until they are sufficiently large to break free from the flat surface and follow the direction of air flow as reentrained particles.

OBJECTS OF THE INVENTION

It is the object of this invention to house, in the vertical space provided by transverse steel channels across the top of an eliminator core, a simple mechanism for displacing the top seal from contact with the eliminator sheets. Such mechanism allowing movement or removal of the sheets without concern for what is above the eliminator core.

Another object of this invention is to provide an easily removable spacer bar designed to reduce pressure drop.

BRIEF DESCRIPTION OF THE DRAWINGS

The specification and the accompanying drawings show and describe a preferred embodiment of this invention and various modifications thereof; but it is to be understood that these are not intended to be exhaustive nor limiting of the invention, but on the contrary are given for the purpose of illustration in order that others skilled in the art may fully understand the invention and the principles thereof and the manner of applying it in practical use so that they may modify and adapt it in various forms, each as may be best suited to the conditions of a particular use.

In the drawings.

DETAILED DESCRIPTION OF THE PREFERRED EMBODIMENT

Figure 1:
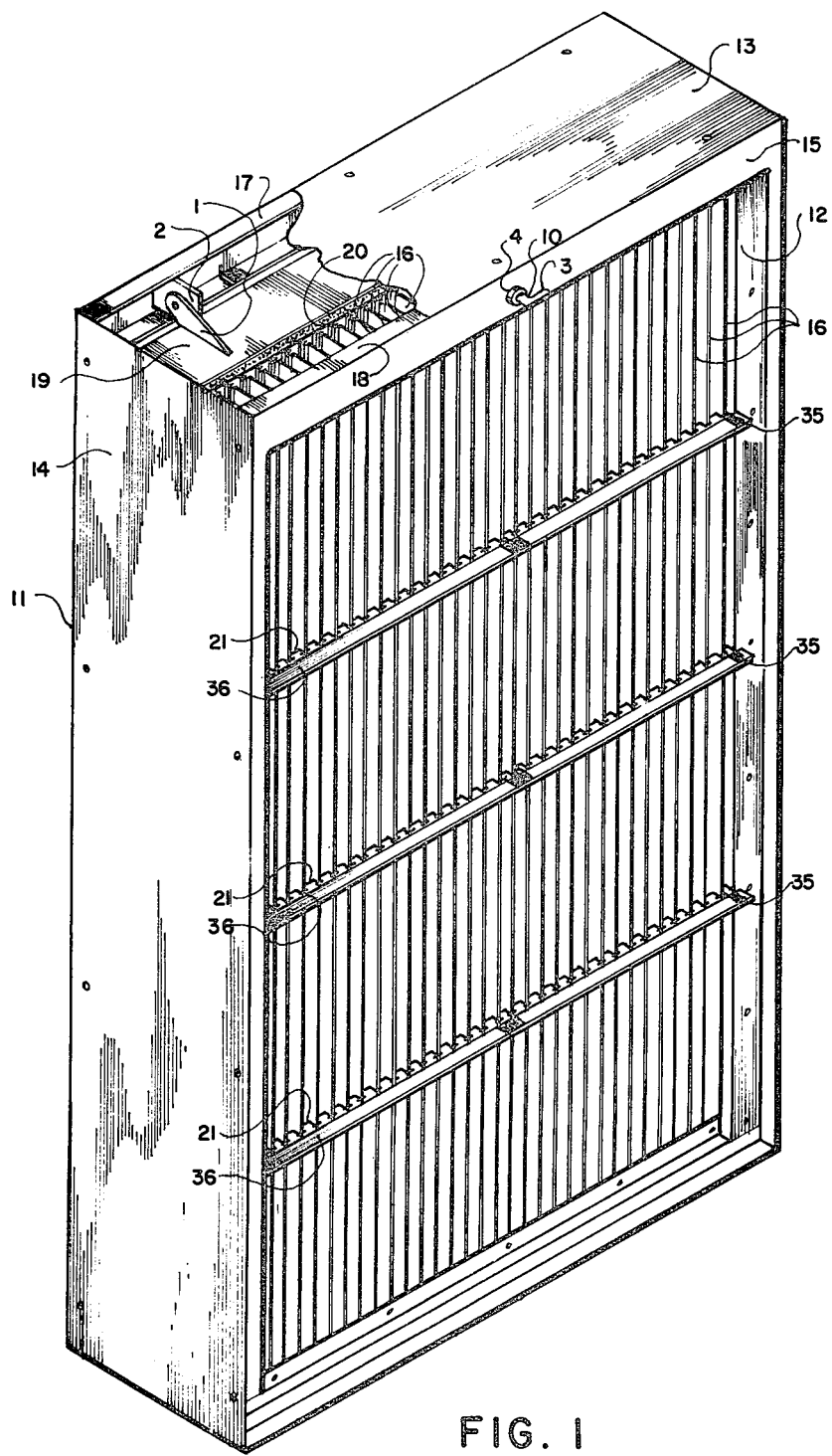
FIG. 1 is a practical view of an eliminator core according to the present invention.

FIG. 1 shows an eliminator core which includes a structural frame 11 having a generally box-like configuration which defines an outlet 12 at one end for the purpose of discharging a gas stream free of entrained particles of liquid and at the opposite end an inlet having the same configuration as the outlet 12 for the purpose of admitting the gas stream with entrained particles of liquid, such as water, therein. An optional top wall 13, sides walls (14 and the opposite side), an outlet end wall 15 and an inlet end wall can be provided and mounted to the frame 11.

A plurality of eliminator sheets 16, which are of conventional rectangular zig-zag construction, are mounted in parallel in the structural frame 11. The sheets 16 are horizontally spaced from one another, disposed uprightly and generally parallel to the direction of flow of the gas stream from the inlet to the outlet 12 through the structural frame 11. The plurality of sheets 16 form a bundle to define tortuous flow paths to channel and act upon the gas stream between the inlet and outlet 12.

A so-called seal grid is defined at the top of the structural frame above the eliminator bundle. In the illustrated embodiment the seal grid is defined by a plurality of support members above and, extending across the bundle, preferably by a first support member 17 which is a channel member or the like, fixedly extending from side to side of the structural frame 11 above the bundle at the inlet end and a second support member 18 which is a channel member or the like, fixedly extending from side to side of the structural frame 11 above the bundle at the outlet end. When the seal grid is provided with the optional top wall 13, side walls (14 and the opposite side), the outlet end wall 15 and the inlet end wall, the seal grid forms an inverted box, the bottom of which is above a closure member 19 and a displacement mechanism at all times.

The closure member 19 is provided to seal the top of eliminator bundle during operation of the air washer to channel the air through the bundle and to give rigidity to the sheets within the bundle. An edge of the closure member 19 is hinged to the frame 11 preferably to the first member 17, to allow movement between a first contact position in which the closure member 19 contacts with the top edges of the eliminator sheets 16 within the bundle and a second open position wherein the closure member 19 is pivoted upward from the first contact position. In the second open position the closure member 19 is not in contact with the top edge of the sheets 16 and the sheets can be moved or removed. Both the first contact position and second open position of the closure member 19 being below the top (the bottom of the inverted box) of and primarily within the seal grid. Attached to the underside of the closure member 19 which is typically a flat metal sheet is an elastomeric pad 20 which serves to contact and seal with the top edges of the sheets 16.

The displacement mechanism is provided to engage and move the closure member 19 between its first contact position and second open position and is mounted to the frame 11 above the eliminator bundle, preferably to the support members 17 and 18. The displacement mechanism is positioned to operate below the top of and primarily within the seal grid except for a portion of the displacement mechanism, being in FIG. 1 an extension of an operating rod 10 with an L-type handle 3 outside the frame 11 on the outlet end 12, accessible for operation of the displacement mechanism from outside the frame 11. The operating rod 10 passes through the second member 18 and is held in position with a bushing 4 mounted on the second member 18.

Figure 2:
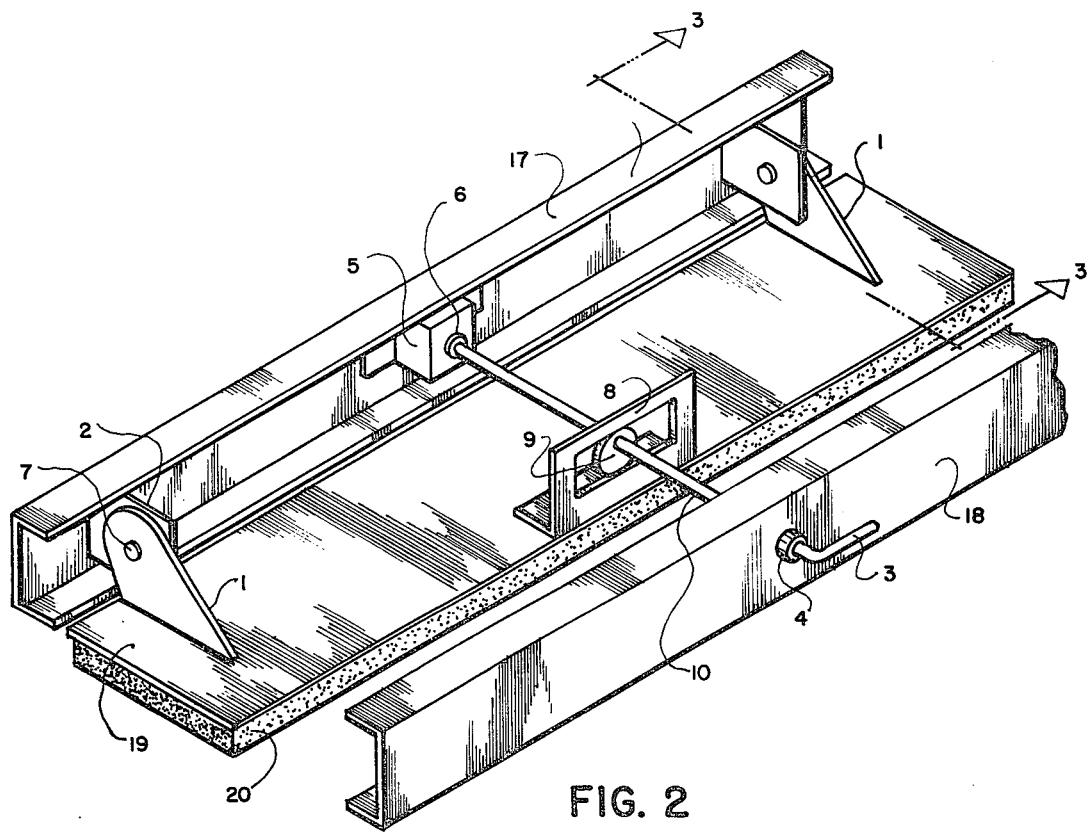
FIG. 2 is a pictorial view, enlarged for purposes of clarity of a detail of the eliminator core shown in FIG. 1.
Figure 3:
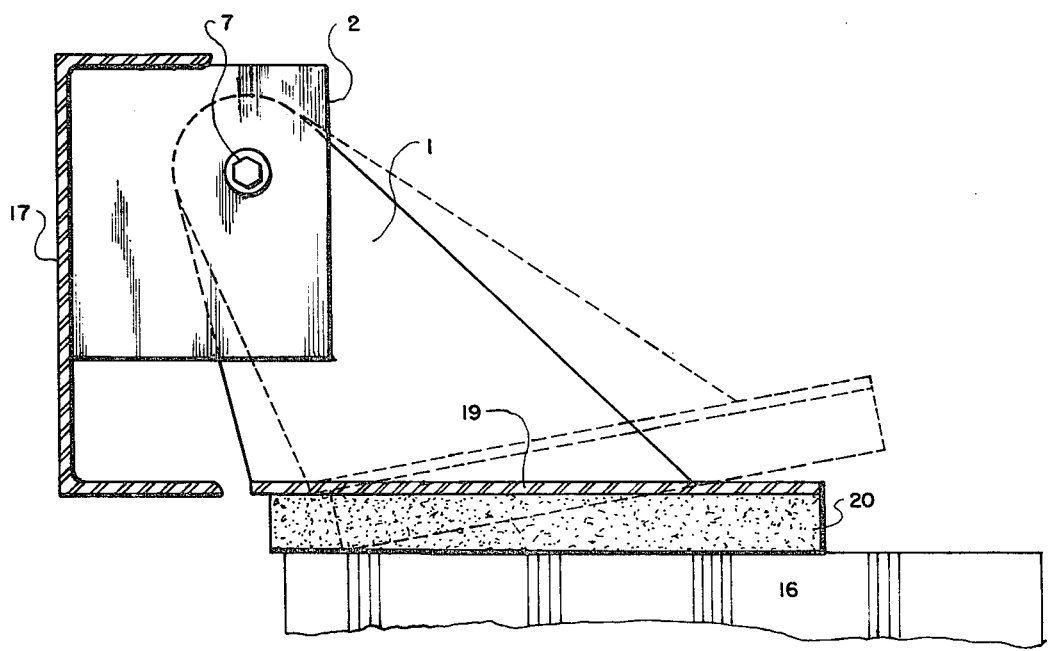
FIG. 3 is an end section taken on line 3—3 of FIG. 2 with a portion of an eliminator sheet 16 added to show contact between the closure member 19 and the top edge of the eliminator sheet 16. By dotted lines a translated position of the closure member 19 is also shown.

In FIGS. 2 and 3, the closure member 19 and the displacement mechanism are shown in more detail. Arm brackets 1 mounted on the closure member 19 are attached with a pivot bushing 7 to brackets 2 located on the first member 17 to allow hinged movement by the displacement mechanism of the closure member 19 between the first contact position and the second open position.

The displacement mechanism includes a cam 9 which contacts the edges of and operates within a cutout portion of a follower plate 8 attached to the top surface of the closure member 19 adjacent the edge opposite the hinged edge at an intermediate position between the arm brackets 1. The cam 9, mounted eccentrically on the operating rod 10, is a fixed circular disc with a flat to permit a two-position operation with the edges of the follower plate 8 cutout to produce the two positions described for the closure member 19. A bushing 6, mounted in an internally located bracket 5 fixed to the first member 17, secures the end of the operating rod 10 opposite the handle 3 and allows rotation of the operating rod 10.

The closure member 19 and the displacement mechanism by operating below the top of the seal grid defined by the support members 17, 18 allow movement or removal of sheets within stacked eliminator cores without necessitating unstacking.

The deflectors, nozzles and other equipment commonly mounted upstream of the eliminator core in an air washer are not shown in the drawings as they do not form part of the invention.

Also shown in FIG. 1 are wire spacer bars 21 mounted in the structural frame 11 to surround and grip the inlet or outlet edges of two or more of the eliminator sheets 16 to maintain the spacing between the sheets and minimize vibration. Each wire spacer bar is a wire of bent configuration, with the bends defining a plurality of equally sized U-shaped notches such that the center lines of adjacent notches are spaced to coincide with the desired spacing, normally equal, between the eliminator sheets of the bundle. At least one wire spacer bar 21 is attached on the inlet end and at least one is attached on the outlet 12 end of the bundle. The wire spacer bars 21 are secured by eyelets 35 to mounting bars 36 which in turn are attached to the frame 11. The mounting bars 36 give additional rigidity to the wire spacer bars 21 and provide an easy means for removing the bars 21 from contact with the sheet 16 edges. The eyelets 35 allow translation of the wire spacer bars 21 in the direction of air flow between an engaged position wherein the notches of the bars 21 surround and grip the edges of eliminator sheets 16 and a disengaged position wherein the bars 21 do not contact the sheets 16 and the sheets 16 can be moved.

Figure 4:
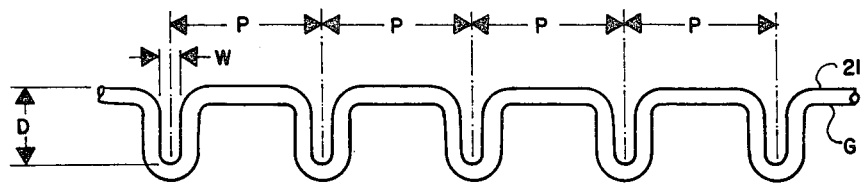
FIG. 4 is a top view of a wire spacer bar as shown in FIG. 1, enlarged for purposes of clarity.

In FIG. 4 a typical section of the wire spacer bar is illustrated. The typical range of spacing P and depth D of the notches depends on eliminator sheet design and are respectively between about ⅞ to 1⅛ inch and ½ to 1¼ inch. The depth D determines the length along the sides of the sheet from the edge which a notch of the bar surounds. The notch width W can be from about ⅛ to ½ inch and is determined by the eliminator sheet thickness at the edge contacted, the width being for admitting the edge of a sheet and slightly smaller to provide frictional gripping. The normal diameter G of the wire is between about ⅛ and ⅜ inch.

Wire is used to refer to material substantially cylindrical in shape. The material can be metal or plastic if of sufficient strength, resilience, and flexibility. The material must have the capability for being bent or molded in the required shape and the strength to retain such shape under the conditions encountered in the air washer. Resilience and flexibility are necessary to allow repeated engagement and disengagement of the wire spacer bars and to withstand buffeting during operation of the air washer.

Figure 5:
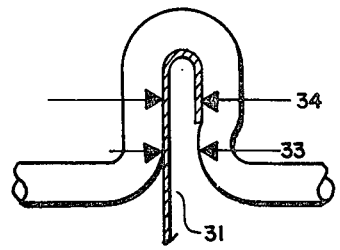
FIGS. 5 and 6 represent modifications of the wire spacer bar of FIG. 4.
Figure 6:
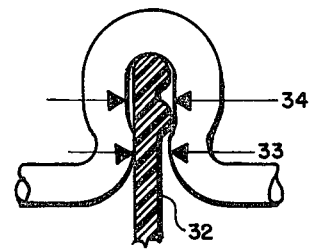

FIGS. 5 and 6 show modified wire spacer bars having snap-on effect to assure a positive grip on each eliminator sheet. The snap-on effect results from employing wire spacer bars having a throat width 33 significantly narrower than a mid notch width 34 with eliminator sheets having a thickening at the edge being surrounded. Sheet edge 31 is typical of a suitable metal eliminator sheet, and edge 32 is typical of a suitable plastic eliminator sheet. Plastic eliminators are preferred for their flexibility, often allowing maintenance with only wire spacer bar disengagement and without sheet removal.

The application of the wire spacer bar to the eliminator sheets 16 can be in many configurations of which only one is shown in FIG. 1. One configuration is to apply bars of 10 to 12 inches in length without a mounting bar. This method of application relies solely on the strength of the wire for spacing and vibration control. One advantage is the ability to place the bars at locations dictated by actual field conditions. Another configuration is to apply bars with a length equal to the eliminator bundle face and with means for fastening the bars directly to the structural frame 11 without use of a mounting bar.

Figure 7:
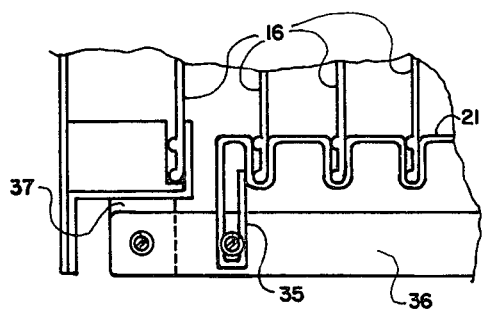
FIG. 7 is a top view of an enlarged detail of the wire spacer bar and mounting bar in FIG. 1.
Figure 8:
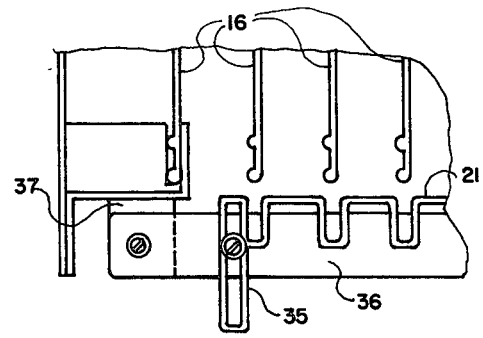
FIG. 8 is a view similar to FIG. 7 but with the wire spacer bar in a translated position.

FIG. 7 shows a configuration for mounting the wire spacer bar 21 to the frame 11. The bar is mounted to a flat thin mounting bar 36 which can be fastened to a vertical side bracket 37 located on the structural frame 11 of the eliminator core. The wire spacer bar 21 incorporates an elongated eyelet 35 which by loosening a screw or like means holding the bar 21 to the thin mounting bar 36 permits translation of the bar 21 in the direction of air flow for engagement or disengagement. In FIG. 7 the wire spacer bar 21 is in the engaged position used during air washer operation in which the sheet edges are surrounded and gripped. In FIG. 8 the wire spacer bar 21 is in the disengaged position for allowing sheet movement. The longest cross-section dimension of the mounting bar 36 is mounted parallel to the direction of air flow in order to minimize the pressure drop.

Figure 9:
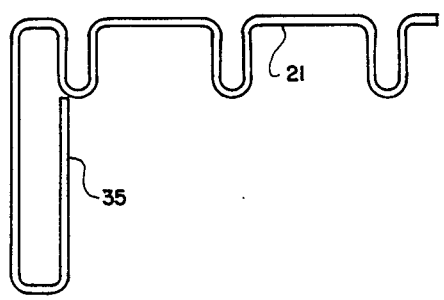
FIG. 9 is an enlarged detail of the wire spacer bar shown in FIG. 7.
Figure 10:
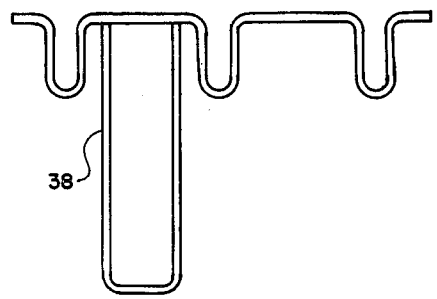
FIG. 10 is similar to FIG. 9, but with an eyelet 38 attached at an interim position along the wire spacer bar.
Figure 11:
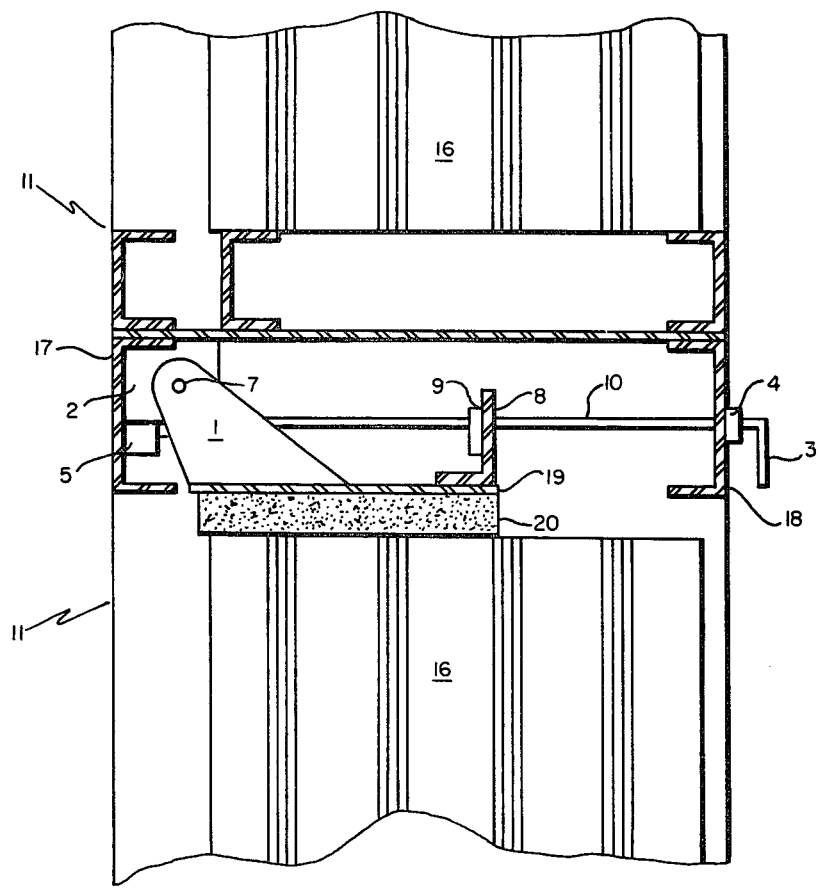
FIG. 11 is a partial side view of a first eliminator core stacked atop a second eliminator core which is constructed according to the present invention.

FIG. 9 is a detail of the wire spacer bar of FIG. 7 with the eyelet 35 unobscured by an attaching means for securing bar 21 to the mounting bar 36. In FIG. 10 an elongated eyelet 38 is attached to a wire spacer bar at an interim position along a wire spacer bar and is attached by welding or similar means. The eyelet 38 can be utilized as an additional attachment means to a mounting bar to provide additional rigidity to the wire spacer bar.

During operation of the air washer, the closure member 19 is in its first contact position as shown in FIG. 2 wherein the closure member 19 sealingly contacts the top edges of the eliminator sheets 16 of the bundle in order that air carrying entrained particles of liquid entering the inlet of the eliminator core is channeled through the tortuous flow paths of the bundle. The wire spacer bars 21 are in their engaged position wherein inlet and outlet edges of the eliminator sheets 16 are surrounded and gripped in order to maintain the spacing and reduce vibration of the sheets 16. The rounded surfaces of the wire of the wire spacer bars 21 presented to the flow stream cause less frictional drag (pressure drop) than flat bar surfaces of similar width.

In order to allow movement or removal of the eliminator sheets 16 for the purpose of performing maintenance or other purpose, the closure member 19 is pivoted upward from the top of the eliminator sheets to its second open position wherein the top seal is broken by turning the handle 3 180 degrees in a vertical plane. The movement of the handle 3 causes the operating rod 10 and the cam 9 mounted thereon to also turn 180 degrees in a vertical plane and the flat on cam 9 to move from a down position contacting the bottom edge of follower plate 8 cutout to an up position contacting the top edge of the follower plate 8 cutout. This rotation of the cam 9 causes the follower plate 8 and with it the closure member 19 to rotate on pivot bushing 7 upward from the top edges of the sheets 16 to the second open position which is indicated by dotted lines in FIG. 3. The wire spacer bars 21 are translated from their position surrounding and gripping the inlet and outlet edges of the eliminator sheets 16 to a noncontacting position with respect to the sheets. The translation of the wire spacer bars 21 is accomplished by their removal from the eliminator core or by translation to a disengaged position with respect to a mounting bar 36 by loosening the attaching means and sliding the eyelets 35 with respect to such attaching means away from the sheets 16. These positions for the closure member 19 and the wire spacer bars 21 allow movement of the sheets 16 within the bundle or removal therefrom through the inlet, outlet or sides of the frame 11 without requiring unstacking an eliminator core or other obstruction atop the eliminator core.

I claim:
1. An eliminator core comprising:
   a. a structural frame having a box-like configuration defining an inlet at one end for admitting a gas stream containing entrained particles of liquid and an outlet at the opposite end for discharging the gas stream free of entrained particles of liquid;
   b. a pluality of eliminator sheets mounted in parallel in said structural frame, the eliminator sheets of said plurality being horizontally spaced from one another, disposed uprightly and generally parallel to the direction of flow of the gas stream from said inlet to said outlet through said frame, said plurality of sheets forming a bundle having tortuous flow paths therebetween to channel and act on the gas stream passing through said bundle to remove entrained liquid particles from the gas stream;

c. a grid above said eliminator bundle defined by a plurality of support members including a first support member mounted to said structural frame above said eliminator bundle to fixedly extend across said inlet end and a second support member mounted to said structural frame above said eliminator bundle to fixedly extend across said outlet end;

d. a closure member hinged to said first support member above said bundle to operate below the top of said grid and hingedly moveable between a contact position, whereat said closure member contacts the top edges of said eliminator sheets within said bundle, and an open position whereat said closure member is pivoted upward from said top edges of the eliminator sheets and does not contact the eliminator sheets; and e. a displacement means mounted to said first support member to engage said closure member and to selectively move the same between the contact position and the open position, said displacement means positioned to operate below the top of said grid.

2. An eliminator core according to claim 1 wherein said closure member is a plate and is hinged at one edge to said first support member and said first support member extends from side to side across said inlet end.

3. An eliminator core according to claim 2 wherein said displacement means comprises a follower plate having a cutout portion attached to said closure plate, an operating rod mounted to said first support member, and a cam mounted eccentrically on said operating rod to engage the edges of said cutout portion of said follower plate to move said closure member between the contact position and the open position as said cam is rotated by rotation of said operating rod.

4. An eliminator core according to claim 3 wherein said follower plate is mounted on the top surface of the closure plate adjacent the edge opposite from said hinged edge.

5. An eliminator core according to claim 3 wherein an end of said operating rod has an extension beyond said structural frame on said outlet end and includes a handle mounted on said extension for rotating said operating rod from outside said structural frame.

6. An assembly of eliminator cores comprising a first eliminator core stacked atop a second eliminator core; wherein said first eliminator core includes:

a. a structural frame having a box-like configuration defining an inlet at one end for admitting a gas stream containing entrained particles of liquid and an outlet at the opposite end for discharging the gas stream free of entrained particles of liquid; and b. a plurality of eliminator sheets mounted in parallel in said structural frame, the eliminator sheets of said plurality being horizontally spaced from one another, disposed uprightly and generally parallel to the direction of flow of the gas stream from said inlet to said outlet through said frame, said plurality of sheets forming a bundle having tortuous flow paths there between to channel and act on the gas stream passing through said bundle to remove entrained liquid particles from the gas stream;

and wherein said second eliminator core includes:

a. a structural frame having a box-like configuration defining an inlet at one end for admitting a gas stream containing entrained particles of liquid and an outlet at the opposite end for discharging the gas stream free of entrained particles of liquid;

b. a plurality of eliminator sheets mounted in parallel in said structural frame, the eliminator sheets of said plurality being horizontally spaced from one another, disposed uprightly and generally parallel to the direction of flow of the gas stream from said inlet to said outlet through said frame, said plurality of sheets forming a bundle having tortuous flow paths there between to channel and act on the gas stream passing through said bundle to remove entrained liquid particles from the gas stream;

c. a grid above said eliminator bundle defined by a plurality of support members including a first support member mounted to said structural frame above said eliminator bundle to fixedly extend across said inlet end and a second support member mounted to said structural frame above said eliminator bundle to fixedly extend across said outlet end;

d. a closure member hinged to said first support member above said bundle to operate below the top of said grid and hingedly moveable between a contact position, whereat said closure member contacts the top edges of said eliminator sheets within said bundle, and an open position whereat said closure member is pivoted upward from said top edges of the eliminator sheets and does not contact the eliminator sheets; and e. a displacement means mounted to said first support member to engage said closure member and to selectively move the same between the contact position and the open position, said displacement means positioned to operate below the top of said grid.

* * * * *